US011356505B2

(12) United States Patent
Nandavar et al.

(10) Patent No.: US 11,356,505 B2
(45) Date of Patent: Jun. 7, 2022

(54) HYBRID CLOUD COMPLIANCE AND REMEDIATION SERVICES

(71) Applicant: Hewlett Packard Enterprise Development LP, Houston, TX (US)

(72) Inventors: Divakar Padiyar Nandavar, Bangalore (IN); Sonu Sudhakaran, Bangalore (IN); Surya NarayanaRaju Penmetcha, Bangalore (IN); Abhishek Srivastava, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 197 days.

(21) Appl. No.: 16/268,716

(22) Filed: Feb. 6, 2019

(65) Prior Publication Data

US 2020/0252451 A1    Aug. 6, 2020

(51) Int. Cl.
*H04L 41/0893* (2022.01)
*H04L 67/51* (2022.01)
*H04L 67/1034* (2022.01)
*H04L 41/0681* (2022.01)
*H04L 41/0686* (2022.01)
*H04L 9/40* (2022.01)

(52) U.S. Cl.
CPC ...... *H04L 67/1034* (2013.01); *H04L 41/0681* (2013.01); *H04L 41/0686* (2013.01); *H04L 41/0893* (2013.01); *H04L 67/16* (2013.01); *H04L 63/20* (2013.01)

(58) Field of Classification Search
CPC . H04L 67/1034; H04L 67/16; H04L 41/0681; H04L 41/0893; H04L 41/0686; H04L 63/20
See application file for complete search history.

(56) References Cited

U.S. PATENT DOCUMENTS

| | | | |
|---|---|---|---|
| 10,033,604 B2 | 7/2018 | Maes et al. | |
| 10,956,224 B1* | 3/2021 | McLaughlin | ....... G06F 11/3003 |
| 2016/0127418 A1 | 5/2016 | Maes et al. | |
| 2017/0141961 A1 | 5/2017 | Cao et al. | |
| 2017/0201569 A1* | 7/2017 | Fu | ...................... H04L 41/0893 |
| 2018/0034703 A1* | 2/2018 | Anholt | .................... H04L 67/10 |
| 2018/0285887 A1* | 10/2018 | Maung | ................. G06Q 30/018 |
| 2019/0190953 A1* | 6/2019 | Feintuch | ............... G06F 40/211 |

(Continued)

OTHER PUBLICATIONS

Github.Com, "Cloud Custodian", May 30, 2018, available online at <https://web.archive.org/web/20180530163400/https://github.com/capitalone/cloud-custodian>, 4 pages.

(Continued)

*Primary Examiner* — Uzma Alam
(74) *Attorney, Agent, or Firm* — Jaffery Watson Mendonsa & Hamilton (57) ABSTRACT

Example implementations relate hybrid cloud compliance and remediation service. A hybrid cloud management system may comprise a first service to evaluate a compliance check for a hybrid cloud environment utilizing a framework that corresponds to different cloud services of the hybrid cloud environment, a second service to publish a compliance event based on the compliance check of the first service, and a third service to route the compliance event based on a remediation action determined by the third service, where the first, second, and third services are deployed as services in a cluster.

20 Claims, 5 Drawing Sheets

(56) References Cited

U.S. PATENT DOCUMENTS

2019/0312909 A1* 10/2019 Kulkarni ................. H04L 63/20
2020/0225924 A1* 7/2020 Sathyanarayanamurthy ...............
                                                          H04L 67/10

OTHER PUBLICATIONS

Github.Com, "CloudEvents", Nov. 25, 2018, available online at <https://web.archive.org/web/20181125014147/https://github.com/cloudevents/spec>, 4 pages.

Cavirin; "Continuous Security Assessment and Remediation for Hybrid Environments"; printed on Oct. 2, 2018 from webpage: http://www.cavirin.com/images/datasheets/cavirin datasheet v1 pdf 2pgs.

Corestack; "Managing Compliance in Multi Cloud Environment"; printed on Oct. 2, 2018 from webpage: https://www.corestack.io/wp-content/uploads/2017/09/managing-compliance-in-multi-cloud-environment.pdf; 6 pages.

* cited by examiner

HYBRID CLOUD COMPLIANCE AND REMEDIATION SERVICES

BACKGROUND

Cloud computing environment includes pools of configurable computer system resources and services. The resources and services can be provisioned with minimal management effort, often over the Internet.

DETAILED DESCRIPTION

A hybrid cloud platform can be a cloud computing service that is composed of some combination of private, public and/or community cloud services. As used herein, a public cloud can, for example, include a standard cloud computing model, in which a service provider makes resources, such as virtual machines (VMs), applications or storage, available to the general public over a network such as the internet. As used herein, a private cloud can, for example, include a model of cloud computing where IT services are provisioned over private IT infrastructure for the dedicated use of a single cloud customer. In some examples, a private cloud can be managed via internal resources. For example, a private cloud can be managed by a cloud customer's compliance group. In some examples, the private cloud can be managed by a cloud customers' human resources department. In some examples, a hybrid cloud service can cross isolation and provider boundaries and can be put in more than one category of private, public, and/or community cloud service in the same platform. Hybrid cloud platform can function by aggregating, integrating, and/or customizing two or more cloud services. Communication between separate services can cause security breaches and/or connectivity issues. To reduce these risks, cloud customers can choose to architect hybrid workloads that work with multiple public cloud providers. However, this can complicate working procedures and be expensive.

In some examples, cloud compliance procedures are put in place to ensure cloud services are in compliance to reduce a security breach. As used herein, a cloud compliance procedure can, for example, include a set of general principles that cloud-delivered systems have to comply with standards that the cloud customers face. For example, standards and regulations, such as the Massachusetts Privacy Law (201 CMR 17), PCI-DSS, SOX, Nevada SB-227, and HIPAA, etc., can have cloud customers evaluate their data protection measures by ensuring compliance and remediation services for a cloud platform are in place. As used herein, remediation can, for example, include an action of remedying a nonconforming action by taking the appropriate corrective action. In some examples, a nonconforming event in the cloud compliance device can be terminated in response to the violation of a compliance rule.

In some examples, each cloud service of the hybrid cloud platform can achieve and adhere with the cloud specific compliance rule using a compliance service. For example, a new hybrid cloud management platform can offer cloud customers a service enabling information technology (IT) to address their challenges by empowering application developers and line of business leaders with easy-to-use, self-service tools for cost management and application deployment. Data for this hybrid platform can be received from related public and private cloud services. Such hybrid cloud platform can utilize continuous compliance validation, which can include the ability to have compliance rules and associated frameworks gathered and categorized. As used herein, compliance validation can, for example, include a procedure to determine how well a prescribed plan or course of action is being carried out. As used herein, a framework can, for example, include common platform for developing cloud-based applications. For example, a framework can include predefined compliance categories that can be used to process compliance checks, and interact with cloud services of a hybrid cloud environment. In some examples, continuous compliance validation and compliance checks can be done on each private/public platform of the hybrid platform. As used herein, a compliance check can, for example, include reviewing compliance related information conforms to a prescribed set of rules. In some examples, validation can show that a device/system/process is operating as intended, and/or that it produces the expected results (or product). Compliance checks and compliance validation can cause the cost to increase and can cause security breaches. For example, setting policies for compliance check and validation can help multiple cloud customers and regulatory bodies to interact, which can increase the cost and expose information to unintended parties.

In some examples, each cloud service of the hybrid cloud platform can remediate the nonconforming action using a remediation service. For example, in response to failing a compliance check, a remediation service can fix the action and communicate with the compliance service to ensure the action passes the compliance check for that action. Communication between separate services can also cause the cost to increase and can cause security breaches.

In some examples, cloud customers may have to be audit ready at any given time. As used herein, audit readiness can, for example, include having the capabilities in place to allow an auditor to scope and perform an audit that results in actionable feedback. As used here, an audit is a systematic and independent examination of books, accounts, statutory records, and documents of a cloud customer, system and or device to ascertain how far the I statements present a true and fair view of the concern. This can involve generating reports on demand indicating the current level of compliance, compliance failures, and trend data for compliance gaps, as well as corrective actions taken for compliance failures. In some examples, if a hybrid cloud environment consists of cloud platforms like cloud (e.g., Amazon Web Services (AWS), Azure), and private cloud (e.g., ESX, Kernel-based Virtual Machine (KVM), Hyper-V) they may have to deal with multiple implementation, user interface (UI), Application programming interface (API), and models to achieve compliance across the cloud platforms. As used herein, a UI can, for example, include a conduit between a human and computer. In some examples, a UI can enable a user to effectively control a computer or machine they are interacting with, and for feedback to be received in order to communicate effective completion of tasks. As used herein, an API can, for example, include a set of defined methods of communication among various components in a computer system. In some examples, dealing with multiple implementation, UI, API, and models can cause delay and a remediation action may not be performed on a timely manner in the event of a compliance failure. Thus, appropriate and timely remediation action may not be taken.

As such, the disclosure is directed to a hybrid cloud management system that aggregates compliance and remediation services in a hybrid platform. In some examples, a UI and a single API can front these services, expediting compliance check and remediation actions. In some examples, the hybrid cloud compliance and remediation services platform can aggregate a plurality of compliance and remediation services and interpret the results through a common cloud event gateway. As used herein, a cloud event gateway can, for example, include an event router designed to drive events. In some examples, the cloud event gateway can use a server. In some examples, the cloud event gateway can include serverless architectures. In some examples, the cloud event gateway service can deliver the events to its subscribers.

Figure 1:
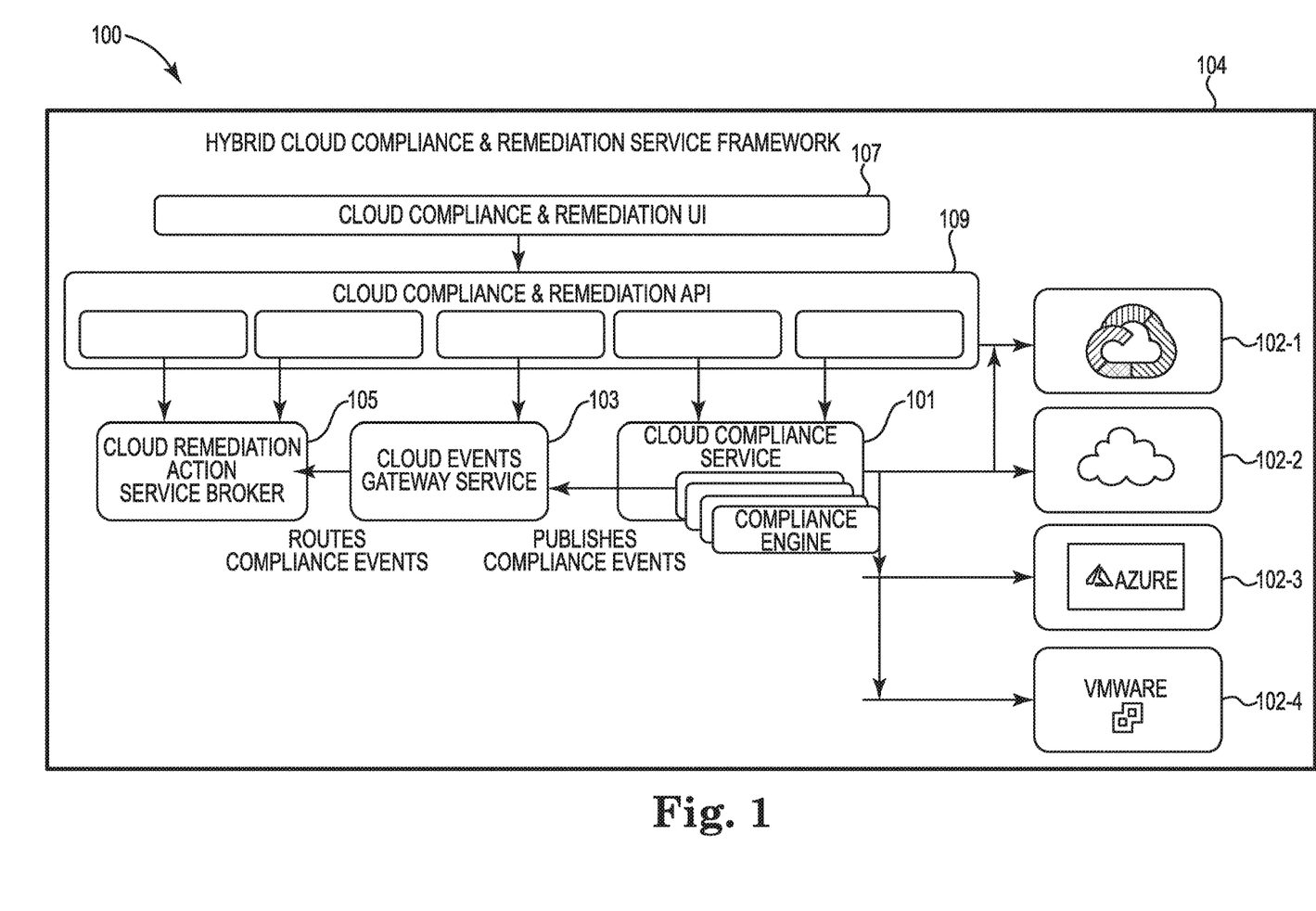
FIG. 1 illustrates an example hybrid cloud management system consistent with the disclosure.

FIG. 1 illustrates an example hybrid cloud management system 100 consistent with the disclosure. The hybrid cloud management system 100 can include a hybrid cloud environment 104, a first service 101, a second service 103, and a third service 105. In some examples, the interactions between the services 101, 103, and 105 of the hybrid cloud management system 100 can be facilitated using a UI 107 and API 109. In some examples, the first service 101 can correspond to different cloud platforms 102-1, 102-2, 102-3, and 102-4 of the hybrid cloud environment 104.

In some examples, the hybrid cloud environment 104 can be a cloud-computing environment. In some examples, data and programs can be stored and accessed from the hybrid cloud environment 104 over the internet. For example, hybrid cloud environment 104 can include employee data of a cloud customer in a private cloud. Private cloud can be constructed on the cloud customer's premise and/or through private cloud provider (e.g., ESX, KVM). In some examples, the hybrid cloud environment 104 can include a public infrastructure as a service (IaaS) platform, such as AWS, Microsoft Azure or Google Cloud Platform. In some examples, the public cloud and the private cloud of the hybrid cloud environment 104 can be connected with each other via a wide area network (WAN). In some examples, the hybrid cloud environment 104 can include a software as a service (SaaS) platform, in which a third-party provider can host applications and make them available to customers over a network such as the internet. In some examples, the hybrid cloud environment 104 can include infrastructure as a service (IaaS) platform, in which a third-party provider offers virtualized computing resources, such as VMs and storage, over a network such as the internet.

Hybrid cloud environment 104 of the hybrid cloud management system 100 can include a first service 101. In some examples, the first service 101 can be a compliance device. As used herein, a compliance device can, for example, include supporting Cloud Security best Practices, Benchmarking frameworks and other automated frameworks for technical and process checks to ensure Cloud applications run smoothly and securely. In some examples, a compliance service can include a plurality of compliance devices. In some examples, a compliance device can be a "Cloud Custodian" an open source component which can be used for compliance check for AWS/Azure Public Cloud and/or Cloud Technology Partner's Managed Cloud Controls (CTP MCC) for compliance check. In some examples, compliance device Aware Security for Linux (WASL) can be used for Linux systems in a Cloud Environment.

As used herein, code of compliance can, for example, include, a set of rules confirming that a system/process conforms to a set of policies determined by an authority. The code of compliance can be determined based on regulatory policies. In some examples, a cloud customer can establish internal code of compliance based on its standard operating procedures. In some examples, the first service 101 can be used to check, track, and maintain the code of compliance for a specific action. In some examples, the first service 101 can utilize a framework that corresponds to different cloud services of the hybrid cloud environment. For example, the first service 101 can correspond to cloud services 102-1, 102-2, 102-3, and 102-4. In some examples, the cloud services 102-1, 102-2, 102-3, and 102-4 can be a combination of public and private cloud services in the hybrid cloud environment 104. For example, cloud services 102-1, 102-2, 102-3 can be public cloud services, and 102-4 can be a private cloud service. In some examples, the first service 101 can correspond to the second service 103. In some examples, the first service 101 can correspond to the third service 105. In some examples, the first service 101 can include compliance policies to ensure that an event adheres to a compliance rule of the first service 101.

In some examples, for each of the cloud services 102-1, 102-2, 102-3, and 102-4 there can be a different compliance device (not shown if FIG. 1). For example, cloud service 102-1 can be a public cloud service for which there can be a compliance device that checks the conformance to the compliance standard of a public cloud service such as Azure. In some examples, cloud service 102-2 can be a public cloud service for which there can be a compliance device that checks the conformance to the compliance standard of a public cloud service such as AWS. In some examples, cloud service 102-3 can be a public cloud service for which there can be a compliance device that checks the conformance to the compliance standard of a public cloud service such as the Google Cloud platform. In some examples, cloud service 102-4 can be a public cloud service for which there can be a compliance device that checks the conformance to the compliance requirement of a private cloud service, such as open source cloud computing. The first service 101 can decipher compliance device types that are utilized by different cloud services of the hybrid cloud environment.

As used herein, device type can, for examples, include a group of devices that has common means to process the data they transmit. Based on the deciphered compliance device types, the first service 101 can perform a compliance check. For example, the first service 101 can determine that the cloud service 102-2 is a public cloud service, such as AWS, and perform a compliance check applicable for the AWS provider according to the code of compliance for AWS. Similarly, the first service 101 can determine that the cloud service 102-1 is a public cloud service, such as Azure, and perform a compliance check applicable for the Azure provider according to the code of compliance for Azure. In some examples, as part of the compliance check, the first service 101 device can generate the events for both successful and unsuccessful checks along with resource details. In case of the failed compliance check for resources, the first device 101 can generate the event including the failed resource details and particulars of the compliance policy associated with the first device 101. In some examples, a compliance service can include plurality of first devices. Each of the first devices may have different formats for such generated events. which can be forwarded to an event gateway where the events are normalized for consumption and taking appropriate action on events. One such action is remediation which cloud service 105 provides.

In some examples, the first service 101 can convert the compliance event check, received from different cloud services such as 102-1, 102-2, 102-3, and 102-4 to a normalized cloud event format. For example, the first service 101 can convert the compliance check received from the cloud service 102-1 and alter and/or convert it to a standard compliance check condition of the first service 101. Similarly, the first service 101 can convert the compliance event check received from the cloud services 102-2, 102-3, and 102-4 and alter it to a standard compliance check condition of the first service 101. In some examples, the first service 101 can convert the compliance check received from different could services, (e.g. 102-1, 102-2, etc.) by organizing compliance check data in a database. This can include the first service 101 creating tables and establishing relationships between those tables according to compliance policies of the first service 101.

The hybrid management system of 100 includes a second service 103. The second service 103 can receive the compliance events forwarded to it based on the compliance check of the first service 101. As used herein, compliance events are published by the first device for a cloud-based service that deliver the content where it is needed and can be tailored. In some examples, a Software-as-a-Service (SaaS) publishing system can be used to publish a compliance event. In some examples, the second service 103 can publish the compliance event as a failed event if the first service 101 determines that an event is in violation of a compliance check. In some examples, the second service 103 can publish the compliance event as a pass event if the first service 101 determines that compliance checks for different cloud services pass the compliance check. The second service 103 can publish the compliance event via a cloud event gateway. In some examples, the cloud event gateway in the second service 103 can use a server. In some examples, the cloud event gateway in the second service 103 can include serverless architectures. In some examples, the second service 103 can unify the contents of the compliance events received by the first service 101 from different compliance devices and convert the compliance events to one single event format using the cloud event gateway. In some examples, the second service 103 can route the single event format to the remediation service 105 via the clouds event gateway. As used herein, routing can, for example, include a process of selecting a path for compliance event traffic in a network, and/or between and across multiple networks.

Hybrid cloud environment 104 of the hybrid cloud management system 100 can include a third service 105. The third service 105 can route the compliance event based on a remediation action determined by the third service 105 for a compliance policy in the first service 101. In some examples, the third service 105 can remediate a nonconforming action by routing a corrective action. In some examples, the third service 105 can remediate a nonconforming action by terminating the nonconforming action. In some examples, the third service 105 can determine a preventative plan based on the type of action that has been in violation.

In some examples, the third service 105 can interpret the compliance event through a cloud event gateway to trigger a customizable cloud remediation action. For example, the third service 105 can interpret that an event is in violation of a compliance check for cloud service 102-1 (e.g. public cloud service such as Azure). In response, the third service 105 can customize a remediation action specific to the cloud service 102-1. Similarly, the third service 105 can interpret that an event is in violation of a compliance check for cloud service 102-2 (e.g. public cloud service such as AWS). In response, the third service 105 can customize a remediation action specific to the cloud service 102-2. In some examples, customizable remediation action can include sending an email alert, altering the access rights on cloud resources, terminating a cloud resource, updating policies, triggering a custom action, and/or providing options for "actions" to be taken on compliance results.

In some examples, the remediation actions can be categorized as passive (e.g., reporting, email, flagging, etc.), proactive (stop service, remove access, initiate script, etc.), and allow actions (allow controls on which frameworks, rules, etc.). In some examples, the third service 105 of the hybrid cloud management system 100 can include a plurality of action drivers for notifying an end user device. For example, the third service 105 can send an alert (via email, text, and/or other custom action) in the event of a compliance failure. The notification can help the third service 105 to take timely remediation action. In some examples, the remediation action can be automated. For example, the third service 105 can be programed to take an appropriate corrective action automatically in response to determining a nonconforming event. In some examples, an end user device can send notification and a remediation action can be performed manually. For example, an email alert can be sent if an event fails to conform to a compliance event check, and remediation action can be taken by a user to correct the action.

The first service 101, the second service 103, and the third service 105 of the hybrid cloud management system 100 can be deployed as services in a cluster. As used herein, a cluster can, for example, include a group of servers and/or other resources that act like a single system and enable high availability. In some examples, a cluster can balance load and can process information parallelly. In some examples, the cluster in which the first service 101, the second service 103, and the third service 105 are deployed can be a kubernetes cluster.

In some examples, the hybrid cloud management system 100 can be fronted with a user cloud compliance and remediation UI 107. In some examples, system 100 can be include a compliance and remediation API 109. The API 109 can have a set of defined methods for the first service 101, the second service 103, and the third service 105 to communicate among each other in the hybrid cloud environment 104. A policy framework can provide the API 109 to configure compliance rules. As used herein, a policy framework can, for example, include a set of policies associated with compliance rules. The UI 107 and the API 109 can consume the policy framework. In the UI, 107 a compliance administrator can define the policies in the policy framework. Similarly, the API 109 can be used to define the policies in the policy framework. In some examples, the UI 107 can expose available policies, resources and created policy framework for administrator to apply them on the cloud services 102-1, 102-2, 102-3. The UI 107 can also include the refreshed logs of remediation actions that are being performed on a cloud service. In some examples, the UI 107 and the API 109 are driven by a remediation framework. As used herein, a remediation framework can, for example, include a set of rules, where each rule is associated with checks and resulting remediation action. In some examples, the UI 107 can provide a cloud compliance dashboard fora UI 107 administrator and/or a user (e.g., auditor, chief technology officer tracking compliance activity, etc.). In some examples, the UI 107 can be extended to edit the policies that can be configured in a compliance device. In some examples the UI 107 can enable customers to access compliance rules and frameworks, create customer frameworks/rules, run provider-delivered frameworks, and/or import custom frameworks (Value-added reseller (VAR)/integrator opportunities, etc.)

Figure 2:
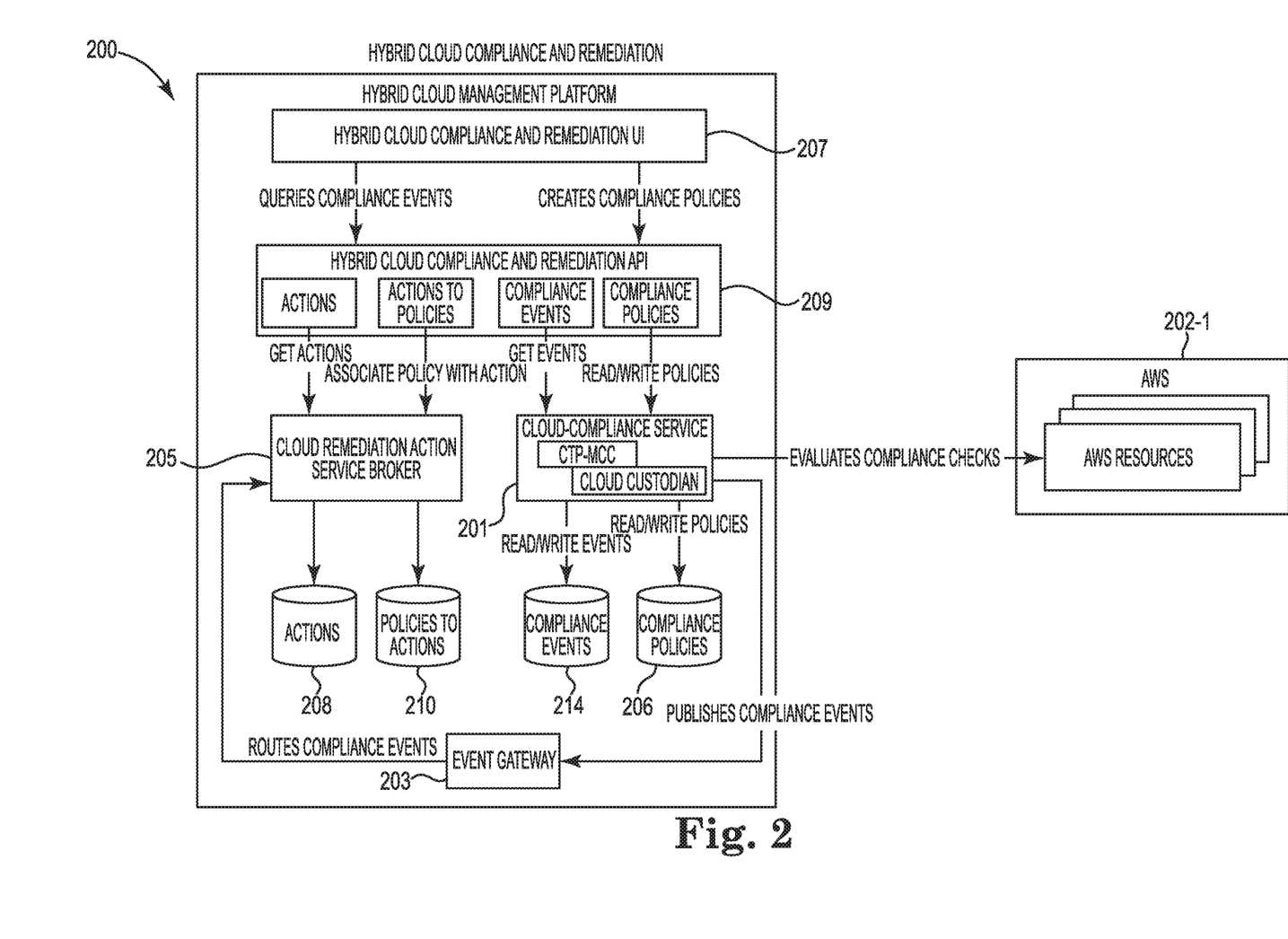
FIG. 2 illustrates a block diagram of an example hybrid cloud management system consistent with the disclosure.

FIG. 2 illustrates a block diagram of an example hybrid cloud management system 200 consistent with the disclosure. The hybrid cloud management system 200 can include a first service 201, a second service 203, and a third service 205. In some examples, the interactions between the services 201, 203, and 205 of the hybrid cloud management system 200 can be facilitated using an UP 207 and API 209. In some examples, system 200 can be include a compliance and remediation API 209. The API 209 can have a set of defined methods for the first service 201, the second service 203, and the third service 205 for the three services to communicate among each other in the hybrid cloud system 200.

In some examples, the first service 201 can be a cloud compliance device. The first service 201 can be used to check, track, and maintain code of compliance. In some examples, the first service 201 can receive instructions from the API 209 to get compliance events. In some examples, the first service 201 can receive compliance policies from the UI 207. In some examples, the UI 207 and API 209 can establish internal code of compliance based on its standard operating procedures. In some examples, the first service 201 can be used to check, track, and maintain the code of compliance for a specific action. In some examples, the first service 201 can utilize a framework that corresponds to different cloud services of the hybrid cloud environment. For example, the first service 201 can correspond to cloud services 202-1, 202-2, 202-3, and 202-4. In some examples, the cloud services 202-1, 202-2, 202-3, and 202-4 can be a combination of public and private cloud services in the hybrid cloud environment. For example, cloud services 202-1, 202-2, 202-3 can be public cloud services, and 202-4 can be a private cloud service. In some examples, the first service 201 can correspond to the second service 203.

In some examples, correspondence can include communication between the first service 201 and the second service 203 and taking an action by the second service 203. For example, the first service 201 can communicate the status of the compliance check, evaluated by the first service 201, to the second service 203. In some examples, the second service 203 can publish the compliance check based on the compliance check, evaluated by the first service 201. In some examples, the first service 201 can correspond to the third service 205. In some example, correspondence can include communication between the second service 203 and the third service 205 taking an action. For example, the second service 203 can publish the compliance event check and the third service 205 can determine a remediation action and route the compliance event check based on the determined remediation action. In some examples, the first service 201 can include compliance policies to ensure that an event adheres to a compliance rule of the first service 201.

In some examples, each of the cloud services 202-1, 202-2, 202-3, and 202-4 can include a different compliance device. For example, cloud service 202-2 can be a public cloud service which includes a compliance device that conforms to the compliance standard of a public cloud service such as Azure. In some examples, cloud service 202-2 can include a compliance device that conforms to the compliance standard of a public cloud service such as AWS. In some examples, cloud service 202-3 can include a compliance device that conforms to the compliance standard of a public cloud service such as the Google Cloud platform. In some examples, cloud service 202-4 can include a compliance device that conforms to the compliance requirement of a private cloud service, such as open source cloud computing. The first service 201 can decipher the type of the compliance service that are utilized by different cloud services. Based on the deciphered compliance service types, the first service 201 can perform a compliance check. For example, the first service 201 can determine that the cloud service 202-2 is a public cloud service such as AWS and perform a compliance check applicable for the AWS provider according to the code of compliance for AWS. Similarly, the first service 201 can determine that the cloud service 202-2 is a public cloud service such as Azure and perform a compliance check applicable for the Azure provider according to the code of compliance for Azure.

In some examples, the first service 201 can convert the compliance event check, received from different cloud services (e.g., cloud services analogous to cloud services 102-2, 102-3 and 102-3 used in relation to FIG. 1) to a normalized cloud event format. For example, the first service 201 can convert the compliance check received from the cloud service 202-2 and alter it to a standard compliance check condition of the first service 201. Similarly, the first service 201 can convert the compliance event check received from the cloud service 102-2, 102-3, and 102-4 and alter it to a standard compliance check condition of the first service 201. In some examples, the first service 201 can convert the compliance check received from different could services, (e.g. 102-3, 102-4 etc.) by organizing compliance check data in a database. This can include the first service 201 creating tables and establishing relationships between those tables according to compliance policies of the first service 201.

In some examples, first service 201 can read and/or write compliance events and determine the compliance event check at device 214. In some example, device 214 can be a database. Database 214 can include information related to compliance events. In some examples, database 214 can be accessed electronically from a computer system. In some examples, the first service 201 can read write policies received from the API 209 and determine the compliance applicable compliance policy at device 206. In some example, the device 206 can be a database. Database 206 can include information related to compliance policies for each of the cloud services, such as cloud services 202-1. In some examples, database 214 can be accessed electronically from a computer system. In some examples, the information checked, tracked, and maintained in the first service 201-1 can be published via an event gateway, as used herein.

The hybrid management system of 200 can include a second service 203. As used herein, the second service 203 can receive the compliance events based on the compliance check of the first service 201. For example, the second service 203 can publish the compliance event as a failed event if the first service 201 determines that an event is in violation of a compliance check. In some examples, the second service 203 can publish the compliance event as a pass event if the first service 201 determines that compliance checks for different cloud services (e.g., cloud service 102-1, 102-2) pass the compliance check. The second service 203 can publish the compliance event via a clouds event gateway. In some examples, the second service 203 can unify the contents of the compliance events received by the first service 201 from different compliance devices and convert the compliance events to one single event format using the clouds event gateway. In some examples, the second service 203 can route the single event format to the remediation service 205 via the clouds event gateway.

The hybrid cloud management system 200 can include a third service 205. The third service 205 can route the compliance event based on a remediation action determined by the third service 205. In some examples, the third service 205 can remediate a nonconforming action by routing a corrective action. In some examples, the third service 205 can determine a preventative plan based on the type of action that has been in violation.

In some examples, the third service 203 can interpret the compliance event through a cloud event gateway to trigger a customizable cloud remediation action. For example, the third service 203 can interpret that an event is in violation of a compliance check for cloud service 202-2 (e.g. public cloud service such as Azure). In response, the third service 203 can customize a remediation action specific to the cloud service 202-2. Similarly, the third service 203 can interpret that an event is in violation of a compliance check for cloud service 202-2 (e.g. public cloud service such as AWS). In response, the third service 203 can customize a remediation action specific to the cloud service 202-2.

In some examples, the third service 205 can read and/or write remediation actions at device 208. In some example, device 208 can be a database. Database 208 can include information related remediation actions based on compliance events. In some examples, database 208 can be accessed electronically from a computer system. In some examples, the third service 205 can read write policies received from the API 209 and determine the applicable remediation policy at device 210. In some example, the device 210 can be a database. Database 210 can include information related to remediation policies for each of the cloud services, such as cloud services 202-1. In some examples, database 210 can be accessed electronically from a computer system. In some examples, the third service 205 of the hybrid cloud management system 200 can include a plurality of action drivers for notifying an end user device. For example, the third service 205 can send an alert (via email, text, and/or other custom action) in the event of a compliance failure. The notification can help the third service 205 to take timely remediation action. In some examples, the remediation action can be automated. For example, the third service 205 can be programed to take an appropriate corrective action automatically in response to determining a nonconforming event. In some examples, an end user device can send notification and a remediation action can be performed manually. For example, an email alert can be sent if an event fails to conform to a compliance event check, and remediation action can be taken by a user to correct the action.

The first service 201, the second service 203, and the third service 205 of the hybrid cloud management system 200 can be deployed as services in a cluster. A cluster can be a group of servers and/or other resources that act like a single system and enable high availability. In some examples, a cluster can balance load and can process information parallelly. In some examples, the cluster in which the first service 201, the second service 203, and the third service 205 are deployed can be a kubernetes cluster.

Figure 3:
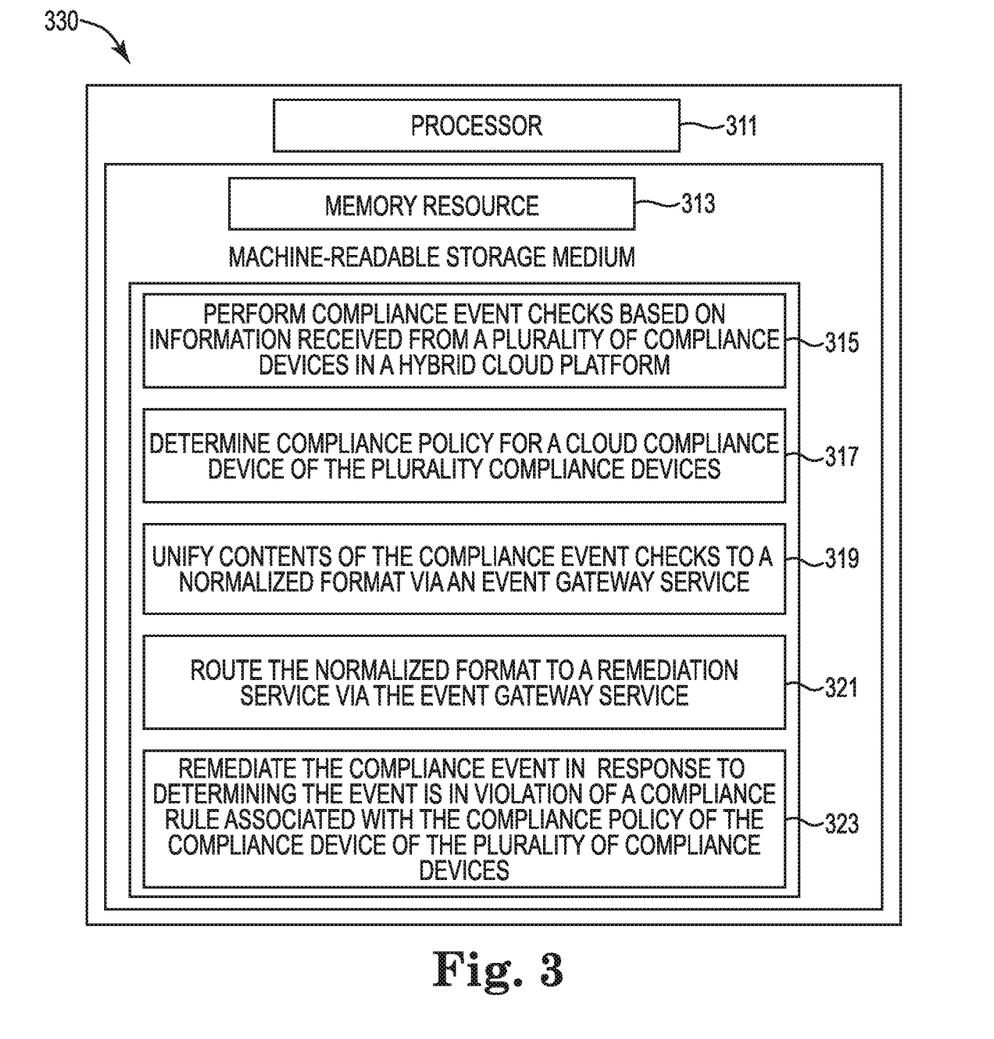
FIG. 3 illustrates an example hybrid cloud management system consistent with the disclosure

FIG. 3 illustrates an example hybrid cloud management system 330 consistent with the disclosure. System 330 can include a processor 311 and a memory resource 313. Memory resource 313 can store machine-readable instructions to cause the processor 311 to perform a number of operations related to hybrid cloud compliance check and remediation services. Machine-readable storage medium of memory resource 313 can include instructions 315, 317, 319, 321, and 323, executed via processor 313, to perform, determine, unify, route, and remediate compliance events. Although the following descriptions refer to a single processor and a single machine-readable storage medium, the descriptions may also apply to a system with multiple processors and multiple machine-readable storage mediums. In such examples, the system 330 may be distributed across multiple machine-readable storage mediums distributed across multiple processors. Put another way, the instructions executed by the system 330 may be stored across multiple machine-readable storage mediums and executed across multiple processors, such as in a distributed or virtual computing environment.

As illustrated in FIG. 3, the system 330 may comprise a processor 311, and a memory resource 313 storing machine-readable instructions to cause the processor 311 to perform a number of operations related to hybrid cloud compliance and remediation services. Processor 311 may be a central processing unit (CPU), microprocessor, and/or other hardware device suitable for retrieval and execution of instructions stored in memory resource 313. With respect to the executable instruction representations or boxes used and shown herein, it should be understood that part or all of the executable instructions and/or electronic circuits included within one box can be included in a different box shown in the figures or in a different box not shown.

Machine-readable storage medium 313 may be any electronic, magnetic, optical, or other physical storage device that stores executable instructions. Thus, machine readable storage medium 313 may be, for example, Random Access Memory (RAM), an Electrically-Erasable Programmable Read-Only Memory (EEPROM), a storage drive, an optical disc, and the like. The executable instructions may be installed on the system 330 illustrated in FIG. 3. Machine-readable storage medium 313 may be a portable, external or remote storage medium, for example, that allows the system 330 to download the instructions from the portable/external/remote storage medium. In this situation, the executable instructions may be part of an "installation package". As used herein, machine-readable storage medium 313 may be encoded with executable instructions to perform compliance event checks, unify contents of the compliance event checks, and remediate the compliance event.

System 330 can include instructions 315 that when executed by the processor 311 can perform compliance event checks based on information received from a plurality of compliance devices in a hybrid cloud platform. In some examples, the hybrid cloud platform can include a first service, a second service, and a third service, as described in FIG. 1. In some examples, the first service can be a compliance device, the second service can be a routing and publishing service, and the third service can be a remediation device. In some examples, the interactions between the services of the system 330 can be facilitated using an UP and an API, as described herein.

In some examples, compliance event checks can be performed in compliance devices that are included in a private cloud platform. In some examples, compliance event checks can be performed in compliance devices that are included in a public cloud platform. In some examples, a cloud compliance device can generate the compliance event checks based on framework built from rules directed by the plurality of compliance devices. For example, a policy framework can be built to terminate an event based on rules described below:

```
{
"id": "1",
"Name": "allowed-amis",
"Resource": "ec2",
"Description": "Any EC2 instance launched from an ami other than the allowed amis will be terminated"
},
{
"id": "2",
"Name": "disallowed-instance-types",
"Resource": "ec2",
"Description": "Any EC2 instance launched from the disallowed instance-type will be terminated"
},
{
```

In some examples, a compliance device can be used to check, track, and maintain code of compliance. In some examples, the hybrid cloud environment can include plurality of compliance devices. For example, a hybrid cloud environment can include a public cloud service which includes a compliance device that conforms to the compliance standard of a public cloud service such as Azure. In some examples, the hybrid cloud environment can include a compliance device that conforms to the compliance standard of a public cloud service such as AWS. In some examples, the hybrid cloud environment can include a compliance device that conforms to the compliance standard of a public cloud service such as the Google Cloud platform. In some examples, the hybrid cloud environment can include a compliance device that conforms to the compliance requirement of a private cloud service, such as open source cloud computing. In some examples, the system 330 can perform compliance event checks for each of the plurality of compliance devices. In some examples, the compliance event check list can be different for each of the plurality of compliance devices.

System 330 can include instructions 317 that when executed by the processor 311 can determine compliance policy for a cloud compliance device of the plurality of compliance devices. In some examples, system 330 can decipher compliance device types of the different cloud services in the hybrid cloud environment. Based on the deciphered compliance device types, the system 330 can determine a compliance policy associated with a specific compliance device. For example, the system can determine that the compliance device is a public cloud service such as AWS and perform a compliance check applicable for the AWS provider according to the code of compliance for AWS. Based on that determination, the system 330 can determine the compliance policy associated with the compliance device for the pubic cloud service such as AWS. Similarly, the system can determine that compliance device is a public cloud service such as Azure and perform a compliance check applicable for the public cloud provider such as Azure according to the code of compliance for Azure. Based on that determination, the system 330 can determine the compliance policy associated with the compliance device for the public cloud service such as Azure.

System 330 can include instructions 319 that when executed by the processor 311 can unify contents of the compliance event checks of the plurality of compliance devices to a normalized format via a cloud event gateway service. As used herein, normalized format can, for examples, include adjusting compliance event checks measured on different compliance devices to a notionally common scale. In some examples, compliance events can be normalized based on attributes, such as type of compliance events, time received, source of the compliance device, etc. In some examples, the normalized format can allow the system 330 to compare corresponding normalized format for different compliance event checks data. For example, a hybrid cloud environment can receive compliance events from public cloud and private cloud services in different formats. At 319 the system 330 can unify the different formats in one uniform format. For example, compliance events data can be received from a first public cloud service in a first format and compliance events data can be received from a second public cloud service in a second format. System 330, at 319, can unify the first and the second format to make the format identical. In some examples, unifying the compliance event tasks to a unified format can help a remediation device to trigger a single remediation action appropriate for all tasks in that format.

System 330 can include instructions 321 that when executed by the processor 311 can route the normalized format to a remediation device via the cloud event gateway service. As used herein, the remediation device can, for example, include a device that can execute the action of remedying, and/or stopping nonconforming actions. In some examples, the cloud event gateway can publish the compliance event checks data to the remediation device. In some examples, the published data can create and send messages to a UI and an API to trigger a remediation action. In some examples, remediation can be an action of remedying a nonconforming action by taking the appropriate corrective action. In some examples, remediation can be reversing or stopping a nonconforming action. In some examples, the remediation devices can be in a different cloud platform than the compliance procedures. In some examples, the remediation device can include its own policy-action mapping device. The policy-action mapping devices drives the remediation device when the event checks value outside the normalized format.

System 330 can include instructions 323 that when executed by the processor 311 can remediate the compliance event in response to determining the event is in violation of a compliance rule associated with the compliance policy of the compliance device of the plurality of compliance devices. In some examples, an API can aggregate data from compliance event checks and publishes the aggregated data, via the cloud event gateway service, to the remediation device. In some examples, the remediation rule is determined based on monitoring and evaluating the compliance checks provided to the policy-action mapping device of the remediation device.

In some examples, the policy-action mapping device of the remediation device can trigger a policy in response to determining the event of the of the cloud compliance device corresponds to an actual violation of a compliance rule. For example, the remediation device can determine that the compliance event checks of a specific cloud compliance device are in violation, as used herein, as well as in violation of a value determined by the compliance policy of the specific compliance device. In response, the policy-action mapping device of the remediation device can determine that the compliance device is in actual violation and trigger a policy to remediate the nonconforming event. In some example, the policy-action mapping device of the remediation device can trigger the policy in response to determining the event of the of the cloud compliance device corresponds to a predicted violation of the compliance rule. For example, the remediation device can determine that the compliance event checks of a specific cloud compliance device are not in violation of the normalized value, as described herein. However, the compliance device is in violation of a value determined by the compliance policy of the specific compliance device. In response the policy-action mapping device of the remediation device can determine that the compliance device is in predicated violation and trigger a policy to remediate the event by taking preventative action.

Figure 4:
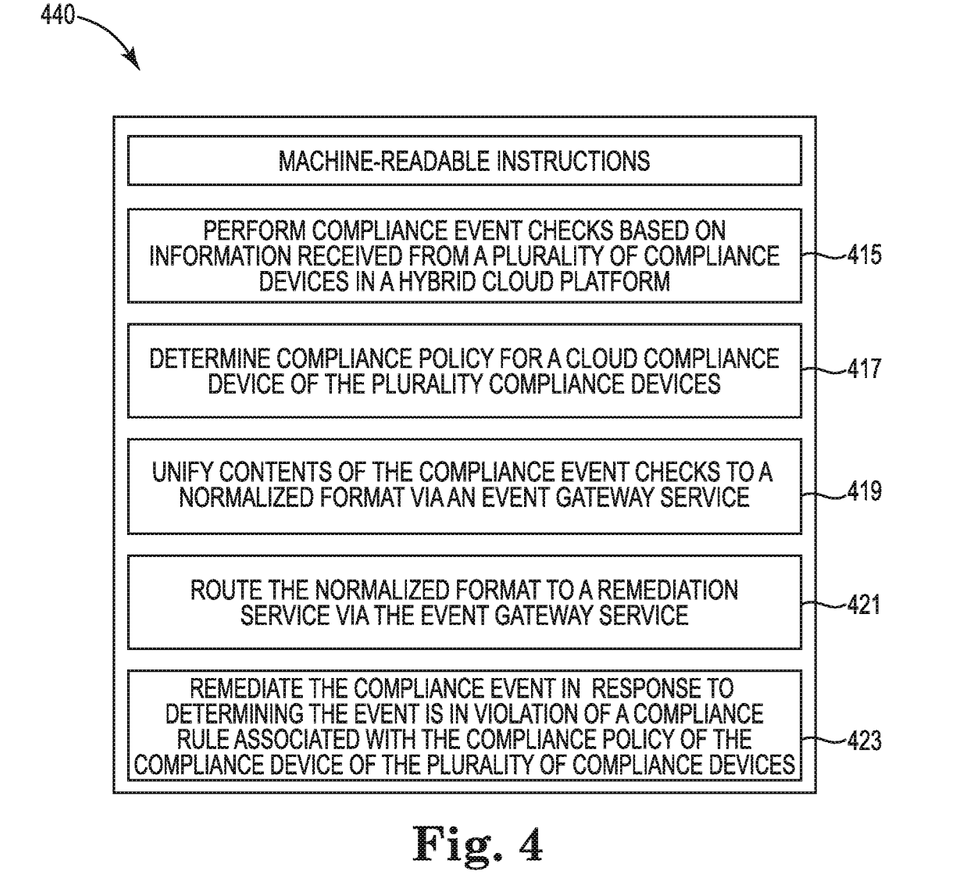
FIG. 4 illustrates a block diagram of an example hybrid cloud management system consistent with the disclosure.

FIG. 4 illustrates a block diagram of an example hybrid cloud management system 440 consistent with the disclosure. The system 440 can include instructions 415, 417, 419, 421 and 423 to perform, determine, unify, route, and remediate compliance events in a hybrid cloud compliance and remediation environment. The system 440 can include a compliance device, a remediation device, and cloud event gateway similar to the compliance device, the remediation device, and the cloud event gateway illustrated in FIG. 1 and FIG. 3. Although not illustrated in FIG. 4 for clarity, and so as not to obscure examples of the disclosure, the system 440 can include a processor memory resource storing machine readable storage medium, similar to the processor 311 and memory resource 313 storing machine-readable storage medium illustrated in FIG. 3.

System 440 can include instructions 415. The system 440 can execute instruction 415 to perform compliance event checks based on information received from a plurality of compliance devices in a hybrid cloud platform. In some examples, compliance event checks can be performed in compliance devices included in a private cloud platform. In some examples, compliance event checks can be performed in compliance devices included in a public cloud platform. In some examples, a cloud compliance device can generate the compliance event checks based on framework built from rules directed by the plurality of compliance devices. In some examples, a compliance device can be used to check, track, and maintain code of compliance. In some examples, the compliance event check list can be different for each of the plurality of compliance devices.

System 440 can include instructions 417. The system 440 can execute instruction 417 to determine compliance policy for a cloud compliance device of the plurality of compliance devices. Based on the deciphered compliance device types, the system 440 can determine a compliance policy associated with a specific compliance device. For example, the system can determine that the compliance device is a public cloud service such as AWS and perform a compliance check applicable for the AWS provider according to the code of compliance for the public cloud service such as AWS. Based on that determination, the system 440 can determine the compliance policy associated with the compliance device for the public cloud service such as AWS. Similarly, the system can determine that compliance device is a public cloud service such as Azure and perform a compliance check applicable for the public cloud service such as Azure according to the code of compliance. Based on that determination, the system 440 can determine the compliance policy associated with the compliance device for the public cloud service such as Azure.

System 440 can include instructions 419. The system 440 can execute instruction 419 to unify contents of the compliance event checks of the plurality of compliance devices to a normalized format via a cloud event gateway service. In some examples, the normalized format can allow the system 440 to compare corresponding normalized formats for different compliance event checks data. In some examples, compliance events can be normalized based on attributes, such as type of compliance events, time received, source of the compliance device, etc. For example, a hybrid cloud environment can receive compliance events data from public cloud and private cloud services in different formats. At 419 the system 440 can unify the different formats in one uniform format. For example, compliance events data can be received from a first public cloud service in a first format and compliance events data can be received from a second public cloud service in a second format. System 440, at 419, can unify the first and the second format to a uniform format via a cloud event gateway.

System 440 can include instructions 421. The system 440 can execute instruction 421 to route the normalized format to a remediation device via the cloud event gateway service. In some examples, the cloud event gateway can publish the compliance event checks data to the remediation device. In some examples, the published data can create and send messages to a UI and API to trigger a remediation action. In some examples, remediation can be an action of remedying a nonconforming action by taking the appropriate corrective action. In some examples, remediation can be reversing or stopping a nonconforming action. In some examples, the remediation devices can be in a different cloud platform than the compliance procedures. In some examples, the remediation device can include its own policy-action mapping device. The policy-action mapping devices drive the remediation device when the event checks value outside the normalized format.

System 440 can include instructions 423. The system 440 can execute instruction 423 to can remediate the compliance event in response to determining the event is in violation of a compliance rule associated with the compliance policy of the compliance device of the plurality of compliance devices. In some examples, an API can aggregate data from compliance event checks and publishes the aggregated data, via the cloud event gateway service, to the remediation device. In some examples, the remediation rule is determined based on monitoring and evaluating the compliance checks provided to the policy-action mapping device of the remediation device. In some examples, the policy-action mapping device of the remediation device can trigger a policy in response to determining the event of the of the cloud compliance device corresponds to an actual violation of a compliance rule. In some example, the policy-action mapping device of the remediation device can trigger the policy in response to determining the event of the of the cloud compliance device corresponds to a predicted violation of the compliance rule.

Figure 5:
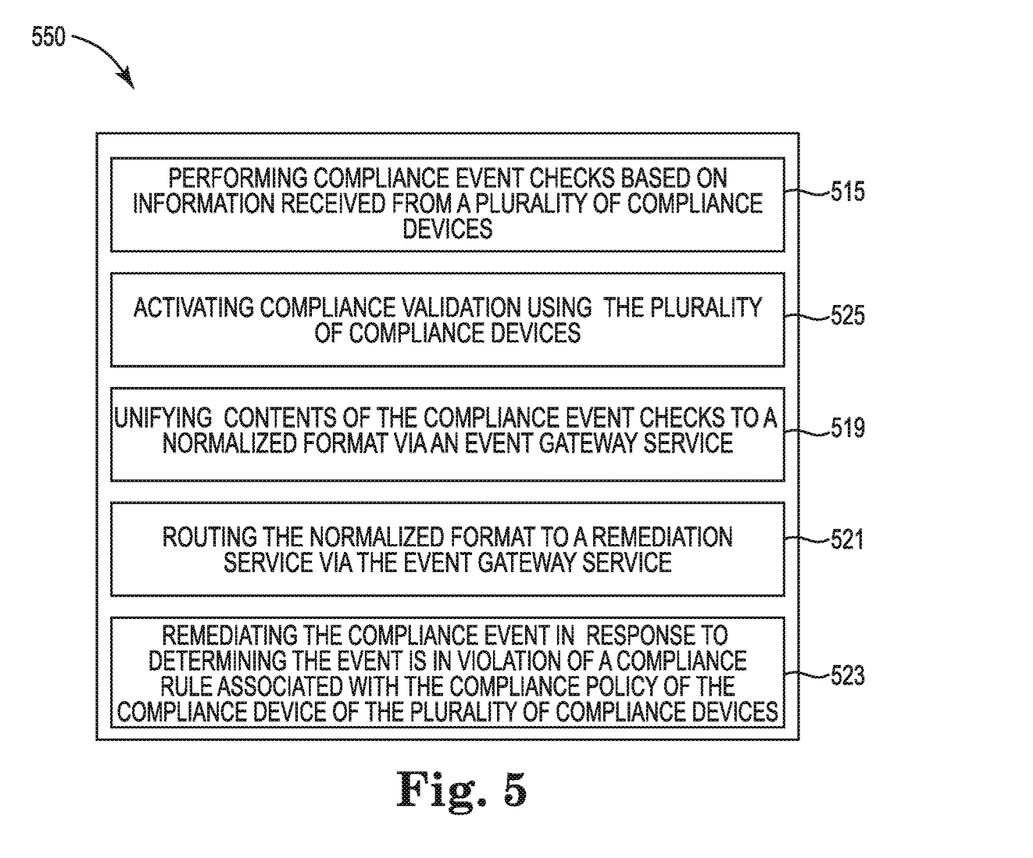
FIG. 5 illustrates an example hybrid cloud management method consistent with the disclosure.

FIG. 5 illustrates an example hybrid cloud management method 550 consistent with the disclosure. Method 550 may be performed, for example, by a hybrid cloud system as described in connection to FIG. 1.

At 515, method 550 can perform compliance event checks based on information received from a plurality of compliance devices. In some examples, compliance event checks can be performed in compliance devices included in a private cloud platform. In some examples, compliance event checks can be performed in compliance devices included in a public cloud platform. In some examples, a cloud compliance device can generate the compliance event checks based on framework built from rules directed by the plurality of compliance devices. In some examples, the compliance event checks can verify whether the plurality of compliance devices are in compliance or in violation of a rule.

At 525, method 550 can activate compliance validation using the plurality of compliance devices. As described herein, compliance validation is a procedure to determine how well a prescribed plan or course of action is being carried out. In some examples, validation can show that a device, system, and a process is operating as intended, that it produces the expected results (or product). In some examples, compliance validation can show that a device/system/process will continue to operate as intended in the future. In some examples, compliance validation can show that a device/system/process is not operating as intended, that it is not producing and/or has the possibility to not produce the expected results (or product) in the future.

In some examples, the outcome of the compliance validation determines the compliance policy that has to be triggered to remediate a nonconforming result. In some examples, a compliance device can activate the compliance validation action. In some examples, the cloud compliance device can include rules, policies, and information (e.g., upper range, lower range, preventative action range, and corrective action range) on compliance devices. In some examples, compliance validation can be done at a specific time interval. In some examples, compliance validation can be done if a compliance check is out of specification. In some examples, compliance validation can be done if a compliance check is at the preventative action range).

At 519, method 550 can unify contents of the compliance event checks of the plurality of compliance devices to a normalized format via the cloud event gateway service. In some examples, the normalized format can allow to compare corresponding normalized values for different compliance event checks data.

At 521, the method 550 can route the normalized format to a remediation device via the cloud event gateway service. In some examples, the cloud event gateway can publish the compliance event checks data to the remediation device. In some examples, the published data can create and send messages to a UI and API to trigger a remediation action. In some examples, remediation can be an action of remedying nonconforming action by taking the appropriate corrective action. In some examples, the remediation devices can be in a different cloud platform than the compliance procedures. In some examples, the remediation device can include its own policy-action mapping device. The policy-action mapping device drives the remediation device when the event checks value outside the normalized format.

At 523, method 550 to can remediate the compliance event in response to determining the event is in violation of a compliance rule associated with the compliance policy of the compliance device of the plurality of compliance devices. In some examples, an API can aggregate data from compliance event checks and publishes the aggregated data, via the cloud event gateway service, to the remediation device. In some examples, the remediation rule is determined based on monitoring and evaluating the compliance checks provided to the policy-action mapping device of the remediation device. In some examples, the policy-action mapping device of the remediation device can trigger a policy in response to determining the event of the of the cloud compliance device corresponds to an actual violation of a compliance rule. In some example, the policy-action mapping device of the remediation device can trigger the policy in response to determining the event of the of the cloud compliance device corresponds to a predicted violation of the compliance rule. In some examples, the remediation device can terminate a nonconforming event in response to determining that an action is nonconforming.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A hybrid cloud management system comprising:
a processor; and
a non-transitory computer-readable medium, coupled to the processor, having stored therein instructions that when executed by the processor cause the processor to:
facilitate, by or on behalf of a cloud customer, processing of compliance checks for a plurality of different cloud platforms of a hybrid cloud environment via a framework that is operable to interact with the plurality of different cloud platforms by:
identifying, by a first service of the framework, a plurality of compliance events by evaluating a plurality of compliance checks for each cloud platform of the plurality of different cloud platforms, wherein the plurality of different cloud platforms include a public cloud platform and a private cloud platform, and wherein the plurality of compliance checks include a check against a standard or regulation and a code of compliance of a particular provider of the public cloud platform;
publishing, by a second service of the framework, a compliance event of the plurality of compliance events corresponding to a compliance check of the plurality of compliance checks for a particular cloud platform of the plurality of different cloud platforms based on a result of said evaluating; and
responsive to a violation of the compliance check, triggering, by a third service of the framework, a customized remediation action to address the violation that is specific to the particular cloud platform, wherein the first, second, and third services are deployed as services in a cluster.

2. The hybrid cloud management system of claim 1, wherein the third service includes a plurality of action drivers to carry out the customized remediation action.

3. The hybrid cloud management system of claim 1, wherein the first service engages a plurality of compliance devices each associated with a respective cloud platform of the plurality of different cloud platforms that are utilized to run the plurality of compliance checks for the respective cloud platform.

4. The hybrid cloud management system of claim 1, wherein different compliance device types are used for the plurality of different cloud platforms of the hybrid cloud environment and the different compliance device types utilize a corresponding compliance event type.

5. The hybrid cloud management system of claim 1, wherein the first service forwards events generated as part of the evaluating to the second service to convert the events into a normalized event format.

6. The hybrid cloud management system of claim 4, wherein the first service includes a shared information exchange platform to receive and categorize compliance events based on policies associated with each of the different compliance device types.

7. The hybrid cloud management system of claim 1, wherein the customized remediation action is performed automatically.

8. The hybrid cloud management system of claim 1, wherein the customized remediation action is performed responsive to user input.

9. A system, comprising:
a processor; and
a memory resource storing non-transitory machine-readable instructions to cause the processor to:
   facilitate, by or on behalf of a cloud customer, processing of compliance checks for a plurality of cloud platforms of a hybrid cloud environment via a framework that is operable to interact with the plurality of different cloud platforms by:
   performing compliance event checks based on information received from a plurality of compliance devices in the plurality of cloud platforms, wherein the plurality of cloud platforms include a public cloud platform and a private cloud platform, and wherein the plurality of compliance checks include a check against a standard or regulation and a code of compliance of a particular provider of the public cloud platform;
   determining a compliance policy for a cloud compliance device of the plurality of compliance devices associated with a particular cloud platform of the plurality of cloud platforms;
   unifying contents of the compliance event checks to a normalized format via a cloud event gateway service;
   routing the normalized format to a remediation device via the cloud event gateway service; and
   remediating a compliance event identified based on the compliance policy and the compliance event checks by triggering a customized remediation action specific to the particular cloud platform.

10. The system of claim 9, wherein an Application Programming Interface (API) aggregates data from the compliance event checks received from the private cloud platform and the public cloud platform and publishes the aggregated data, via the cloud event gateway service, to a remediation device.

11. The system of claim 9, wherein the cloud compliance device generates the compliance event checks based on a policy framework built from rules received from a plurality of compliance devices.

12. The system of claim 9, wherein remediation is based on monitoring and evaluating the compliance event checks provided to a policy-action mapping device of the remediation device.

13. The system of claim 12, wherein the policy-action mapping device of the remediation device triggers the customized remediation action in response to determining the compliance event corresponds to an actual violation of a compliance rule associated with the compliance policy.

14. The system of claim 12, wherein the policy-action mapping device of the remediation device triggers the customized remediation action in response to determining the compliance event corresponds to a predicted violation of a compliance rule associated with the compliance policy.

15. The system of claim 9, wherein a nonconforming event in the cloud compliance device is terminated in response to the violation of the compliance rule.

16. A method comprising:
performing a plurality of compliance event checks based on information received from a plurality of compliance devices of a plurality of cloud platforms of a hybrid cloud environment, wherein the plurality of cloud platforms include a public cloud platform and a private cloud platform, and wherein the plurality of compliance checks include a check against a standard or regulation and a code of compliance of a particular provider of the public cloud platform;
activating compliance validation using the plurality of compliance devices;
unifying contents of the compliance event checks to a standard compliance event format via a cloud event gateway service;
routing the standard compliance event format via the cloud event gateway service; and
remediating a compliance event, in response to determining a corresponding compliance event check of the plurality of compliance events is in violation of a compliance rule of a compliance policy associated with a cloud compliance device of the plurality of compliance devices associated with a particular cloud platform of the plurality of cloud platforms by triggering a customized remediation action specific to the particular cloud platform.

17. The method of claim 16, comprising determining the plurality of compliance devices are performing a prescribed course of action.

18. The method of claim 16, wherein the cloud compliance device triggers a compliance validation action.

19. The method of claim 18, wherein the cloud compliance device includes rules, policies, and information pertaining to the plurality of compliance devices.

20. The method of claim 16, wherein said performing compliance event checks includes verifying whether the policies defined in the plurality of compliance devices are in compliance with a rule.

* * * * *